United States Patent
Ulutürk et al.

(10) Patent No.: US 11,559,934 B2
(45) Date of Patent: Jan. 24, 2023

(54) HEATING DEVICE FOR THE TEMPERATURE CONDITIONING OF PREFORMS, AND METHOD FOR OPERATING A HEATING DEVICE OF THIS KIND

(71) Applicant: KHS GmbH, Dortmund (DE)

(72) Inventors: Deniz Ulutürk, Hamburg (DE); Daniel Firchau, Mölln (DE); Bernd Zimmering, Hamburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/643,977

(22) PCT Filed: Sep. 4, 2018

(86) PCT No.: PCT/EP2018/073713
§ 371 (c)(1),
(2) Date: Mar. 3, 2020

(87) PCT Pub. No.: WO2019/048419
PCT Pub. Date: Mar. 14, 2019

(65) Prior Publication Data
US 2021/0060846 A1     Mar. 4, 2021

(30) Foreign Application Priority Data

Sep. 10, 2017   (DE) .................... 10 2017 120 862.3

(51) Int. Cl.
*B29C 49/78*   (2006.01)
*B29C 49/64*   (2006.01)

(52) U.S. Cl.
CPC ...... *B29C 49/6418* (2013.01); *B29C 49/6436* (2013.01); *B29C 49/786* (2013.01); *B29C 49/78* (2013.01)

(58) Field of Classification Search
CPC ............ B29C 49/6418; B29C 49/6436; B29C 49/786; B29C 2949/78151; B29C 2949/78663; B29C 49/78; B29B 13/02
See application file for complete search history.

(56) References Cited

U.S. PATENT DOCUMENTS

| 4,076,071 A | 2/1978 | Rosenkranz et al. |
| 5,346,386 A | 9/1994 | Albrecht et al. |
| (Continued) | | |

FOREIGN PATENT DOCUMENTS

| CN | 105313310 A | * 7/2014 | ............ B29C 49/78 |
| DE | 2352926 A1 | 4/1975 | |
| (Continued) | | | |

OTHER PUBLICATIONS

International Search Report dated Jan. 8, 2019 filed in PCT/EP2018/073713.

*Primary Examiner* — Matthew J Daniels
*Assistant Examiner* — Shibin Liang
(74) *Attorney, Agent, or Firm* — Rankin, Hill & Clark LLP

(57) ABSTRACT

A method for operating a heating device for thermal conditioning preforms made of a thermoplastic material in which each respective one of the preforms is prepared for a subsequent forming process during which the preforms are formed into containers with a forming fluid fed under pressure into the preforms. The heating device is operated in at least a first operating state and a second operating state. The second operating state is a startup phase of the heating device during which a temperature of the heating device approaches an equilibrium temperature of a thermodynamically stable equilibrium state of the heating device. The first operating state is a continuous operation state following the startup phase. The second operating state is operated with a heating output value that varies over time. Furthermore, the (Continued)

Figure 1:
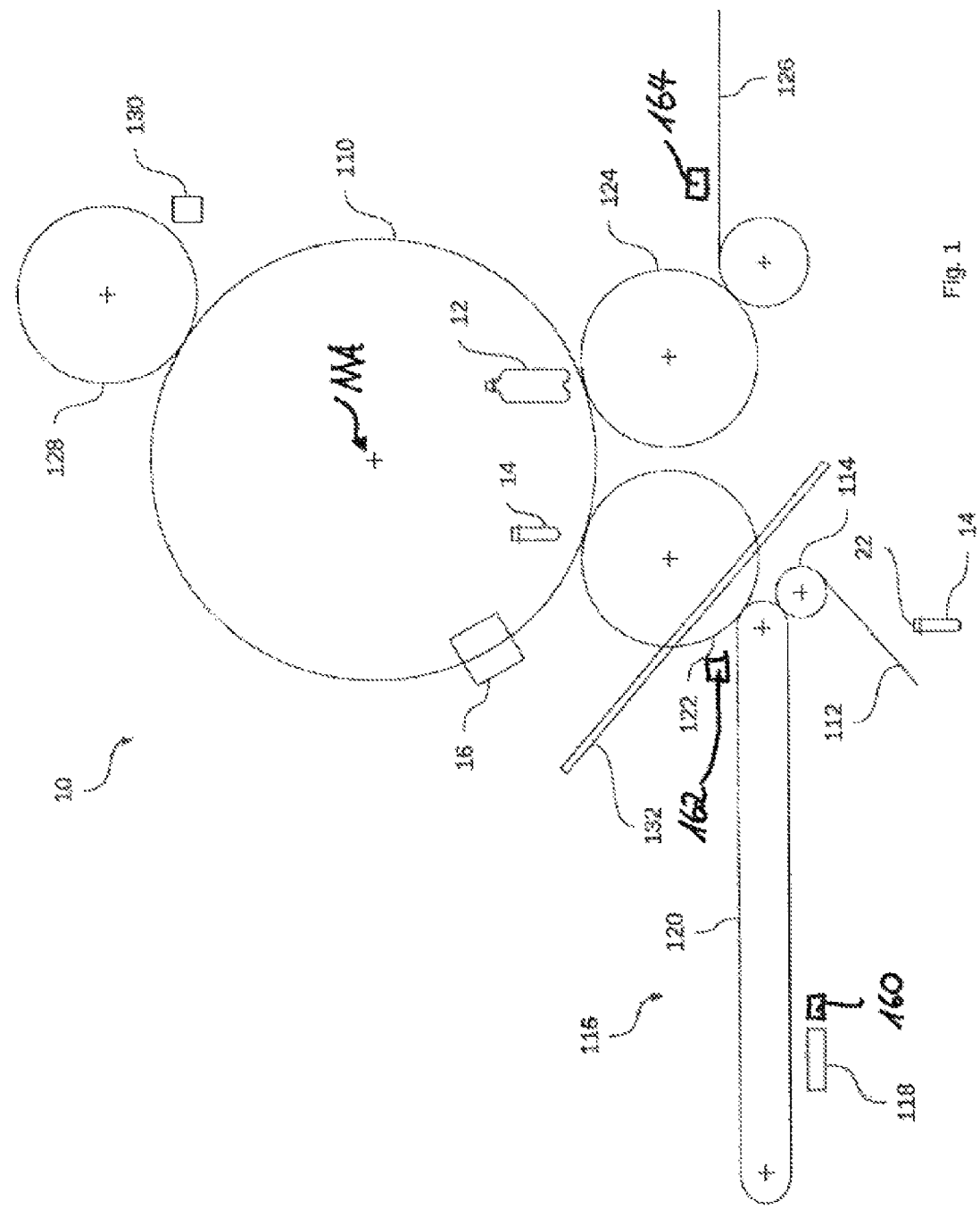

invention relates to a heating device and a machine having a heating device, which are configured to implement the method.

11 Claims, 7 Drawing Sheets

(56) References Cited

U.S. PATENT DOCUMENTS

| | | |
|---|---|---|
| 5,648,026 A | 7/1997 | Weiss |
| 7,216,005 B2 * | 5/2007 | Shioiri .................. B29C 45/766 700/48 |
| 7,914,726 B2 | 3/2011 | Andison et al. |
| 9,381,676 B2 * | 7/2016 | Derrien ............... B29C 49/6418 |
| 2011/0294086 A1 | 12/2011 | Voth et al. |
| 2012/0266567 A1 | 10/2012 | Haesendonckx et al. |
| 2013/0195431 A1 | 8/2013 | Derrien et al. |
| 2015/0037518 A1 | 2/2015 | Haner et al. |
| 2016/0144560 A1 | 5/2016 | Emori |

FOREIGN PATENT DOCUMENTS

| | | |
|---|---|---|
| DE | 4212583 A1 | 10/1993 |
| DE | 4340291 A1 | 6/1995 |
| DE | 102010007541 A1 | 6/2011 |
| EP | 2749397 A1 | 7/2014 |
| EP | 2835248 A2 | 2/2015 |
| FR | 2965746 A1 | 4/2012 |
| WO | 2011063784 A2 | 6/2011 |

\* cited by examiner

HEATING DEVICE FOR THE TEMPERATURE CONDITIONING OF PREFORMS, AND METHOD FOR OPERATING A HEATING DEVICE OF THIS KIND

The invention relates to a method for operating a heating device for the temperature conditioning of preforms made of a thermoplastic material. The invention furthermore relates to a heating device for the temperature conditioning of preforms. Finally, the invention relates to a machine for the production of containers from preforms.

It is known how to produce containers by blow molding from a thermoplastic material, such as preforms of PET (polyethylene terephthalate), wherein the preforms are taken inside a blow molding machine to various processing stations (DE 43 40 291 A1). Typically, a blow molding machine comprises a heating device for the tempering or thermal conditioning of the preforms and a blow molding device with at least one blow molding station, in which the previously temperature-conditioned preform is expanded into a container. The expansion is done with the aid of a compressed gas (compressed air) as the pressure medium, which it channeled into the preform being expanded with a forming pressure. The process technology for such an expansion of the preform is explained in DE 43 40 291 A1. The basic layout of a blow molding station is described in DE 42 12 583 A1. Possibilities for tempering of the preforms are explained in DE 23 52 926 A1. By tempering or thermal conditioning is meant here that the preform is warmed up to a suitable temperature for the blow molding and a temperature profile is optionally imposed on the preform. The blow molding of containers from preforms with the additional use of a stretching rod is likewise known.

According to a typical processing method, the containers produced by blow molding are taken on to a subsequent filling device and filled here with the intended product or filling material. Thus, a separate blow molding machine and a separate filling machine are used. It is also known how to combine the separate blow molding machine and the separate filling machine into a machine block, i.e., a blow molding and filling block, in which the blow molding and the filling continue to occur at separate machine components and successively in time.

Furthermore, it has already been proposed to produce containers, especially those in the form of bottles, from thermally conditioned or tempered preforms and at the same time to fill them with a liquid filling material, which is supplied as a hydraulic pressure medium for the expanding of the preform or the forming of the container with a forming and filling pressure, so that the respective preform is formed into the container at the same time as the filling process. Such methods in which a simultaneous forming and filling of the respective container occurs can also be called hydraulic forming methods or hydraulic container forming. It is also known here how to assist this forming by the use of a stretching rod. Here as well, the preform is first temperature-conditioned before the forming and filling process.

When the container is formed from the preform by the filling material itself, i.e., using the filling material as a hydraulic pressure medium, only a single machine is required for the forming and filling of the container, although this machine has greater complexity. One example of such a machine is shown in U.S. Pat. No. 7,914,726 B2. Another example is shown in DE 2010 007 541 A1.

As regards the temperature conditioning of the preforms, the requirements are basically identical regardless of whether the forming of the preform provided with a suitable temperature profile occurs in a subsequent step by means of introducing a gas under pressure or by means of a liquid under pressure. The respective heating device provided for the thermal conditioning of the preforms and the respective method used for operating such a heating device are thus the same for both known forming methods. The invention described below applies equally to both described forming methods.

Heating devices known in the prior art consist, for example, of multiple so-called heating boxes. These heating boxes are usually placed stationary along a heating zone and the preforms are taken through these heating boxes by means of suitable transporting devices, being heated in the process. The usual transporting devices consist, for example, of a revolving transport chain. The chain links are formed, for example, by transport mandrels, each of which holds a preform by clamping the mouth section of the preform and moving it during its revolving movement along the heating zone and through the heating boxes.

As a rule, the heating device has a modular design, i.e., many such heating boxes are arranged as a heating module along the heating zone. These may be heating boxes of the same kind or heating boxes of different kind.

Inside the heating box there are arranged heating elements, for example. Near infrared (NIR) radiators are used preferably as the heating elements in the prior art; for example, multiple near infrared radiators may be arranged one above another as heating elements in the lengthwise direction of a preform. One example of such a heating device and one example of the typical layout of an aforementioned heating module known as a heating box is shown in EP 2 749 397 A1 or also in WO 2011/063784 A2.

It is known in the prior art that these heating devices are connected to a control device. This control device is generally designed so that the preforms are heated inside the heating device such that they leave the heating device with a desired temperature profile. By this is meant that both a particular temperature is realized in the preform and a particular temperature variation is realized in the lengthwise direction of the preform and optionally also in the circumferential direction of the preform. It is also known in the prior art how to provide, for example in addition to the aforementioned heating elements, also devices for cooling the surface of the preforms, such as devices for specifically directing a cooling stream of air onto the preform surface. These additional cooling devices may also be incorporated in the mentioned control device of the heating device. The term control device and control method encompasses devices and methods by which an "open-loop control" is carried out, those by means of which a "closed-loop control" is carried out, and mixed forms of these.

In order to regulate and/or control the heating device so that the preforms are temperature-conditioned as desired at the exit from the heating device, i.e., they have the desired temperature and the desired temperature profile, it is known in the prior art how to arrange a measuring sensor for example at the exit from the heating device, such as a pyrometer, which measures the surface temperature of the preforms moving past the measuring sensor. The command value of the closed-loop control in such an embodiment would be the surface temperature of the preforms. This measured value may for example be compared to a target value, and the closed-loop control of the heating device can thus be established as a closed-loop control of a target value for the surface temperature of the preforms.

In known heating devices it is sometimes provided to make a distinction for heating elements situated one above another in regard to the lengthwise direction of the preforms. For example, a particular heating output is defined each time for the heating elements situated one above another, which is regulated and/or controlled by the control device. For example, a presetting can be done in the control device, e.g., by the operator of the machine, as to whether and how heating elements arranged at different height levels should heat differently. The control device may provide height-specific parameters for this. Furthermore, it is known how to set an overarching output parameter that applies to all the heating elements. The actual heating output set by the control device for a radiator level, i.e., all the heating elements situated at the same height level, then results by multiplying the two parameters. A given heating profile can be set by the individual setting of the heating output for each heating element level. Thus, for example, the heating output on each level can be set such that certain areas of the preform are heated more intensely. At the same time, the overall heating output can be set using the overarching output parameter in common to all the heating elements. In the prior art, the heating device is regulated in that the overarching output parameter is adjusted in dependence on the pyrometer measured value. The pyrometer measured value represents the command value of the closed-loop control, i.e., the surface temperature of the preforms, for example. The height-specific parameter is not regulated in the prior art, but instead results from the desired temperature profile the axial direction of the preform. It is generally set when setting up or starting the machine and is altered as needed by the machine operator, e.g., when switching the production to different preforms.

The known heating devices and the known control devices and control methods for these heating devices produce good results when the heating device has reached its equilibrium temperature in the thermodynamically stable equilibrium state and is operated in continuous operation and in this state. This thermodynamically stable equilibrium state exists when, after a certain operating time, the elements forming the heating device such as the heating elements, reflectors, etc., have reached a temperature which remains substantially constant in the further operation. Such a thermodynamically stable equilibrium state, however, does not yet exist when the heating system is placed in operation or when the heating system is moved from a so-called inline operation back to a production operation. "Inline operation" means an operating state in which the regular container production process and thus also the regular heating process is interrupted, for example, on account of operating disturbances. During operating disturbances, the entry of preforms in the heating device is generally interrupted and the heating device continues to operate at a low heating output value. Only in event of long-lasting operating disturbances will the heating device be switched off entirely. Heating devices exhibit a nonsteady radiating and heating behavior in such startup phases, i.e., operating phases outside of the continuous operation. This nonsteady behavior results substantially from two effects. At the starting time of the heating device, the components of the device itself have not yet arrived at their final operating temperature. Therefore, stable thermal and geometrical conditions do not yet exist. The thermal radiation impinging on the preforms moved through the heating device is therefore not yet in a thermodynamic equilibrium in the startup phase, because reflectors or other components situated in the heating device have not yet reached their equilibrium temperature. But the reflectors or other components of the heating device represent secondary radiators. The glass bulbs of the radiators or any filters present also may not have reached their equilibrium state and there are further effects on the radiation intensity affecting the preforms, such as those in regard to the wavelength spectrum of the radiation impinging on the preforms.

A further aspect is that no preforms have yet entered the heating device the startup phase. In the prior art, it is customary to let the preforms enter the heating device only after reaching a given heating device temperature. With the arrival of the first preforms, the relation between radiating and absorbing surfaces changes constantly.

Thus, the preforms are heated differently in these startup phases of the heating device. Accordingly, the containers produced from the preforms have a variance in their properties.

The temperature prevailing in the heating device is measured in the prior art by temperature sensors, for example, which may be arranged in a reflector of the heating device, for example. Such a temperature measurement may be used, for example, to determine whether the heating device has reached a certain target temperature at which the entry of the preforms in the heating device is commenced. It is also possible to provide several such temperature sensors.

Thus, while satisfactory results for container quality can be achieved during the operation of known heating devices in continuous operation, i.e., after the end of the startup phase of such a heating device, since the known control devices of the heating devices in the prior art function adequately, problems result in the container quality prior to the continuous operation, namely, before reaching an at least approximately thermodynamically stable equilibrium state. Basically, of course, it would be possible to organize the startup time of the heating device such that an approximately thermodynamically stable equilibrium state is reached with good reliability, i.e., the components of the heating device have reached their thermal equilibrium state or a state close to their thermal equilibrium, before the preforms are allowed to enter the heating device. But this would mean that some time must pass before container production commences. Typical startup times are in the range of minutes and may amount to 5 minutes, for example. Yet the earliest possible commencement of production is desirable for a more effective utilization of the available machines and a more effective utilization of the heating energy. Therefore, in the prior art the container production begins already long before the heating device has reached its continuous operating state, i.e., it is still in the startup phase.

It is known that the heating device in this startup phase is controlled or regulated differently from that in the continuous operation. The above described closed-loop control by means of measuring the temperature of the preforms and a transition to the continuous operating state is only possible when the first preforms have left the heating device, since only at this time can a command value be generated by measuring the preform temperature. It is therefore known how to operate the heating device in a different way, for example after reaching a first target temperature in the heating device, that at the time when the first temperature measurement of the preforms takes place. The above described closed-loop control of the heating device in continuous operation then commences. Prior to this, the heating device is operated by a different method.

Before the heating device reaches its thermodynamically stable equilibrium state at full production output, it has a tendency to furnish too little thermal energy to the preforms. The reason is that heated components of the device act as secondary radiators and emit longer wave radiation with increasing temperature, which is especially readily absorbed by PET, for example. This long-wave radiation component of secondary radiators is smaller prior to reaching the thermodynamically stable equilibrium state. For this reason, it is known in the prior art how to set the overall heating output of the heating device at a higher value than that corresponding to a basic value for the continuous operation when loading the heating device with preforms before reaching the continuous operating state and thus also appreciably before reaching the thermodynamically stable equilibrium state. This higher heating output value for the heating device is at first held constant, until the heating device is fully loaded. Only then does the closed-loop control for the continuous operation commence, as described above, because only then are temperature measurements on preforms possible.

The higher heating output dictated in the startup phase of the heating device is taken for example from a so-called trend curve, containing for example empirically determined relations between the output of the heating device and the heating device temperature. The open-loop control of the heating device or the heating output of the heating device in this startup phase thus occurs with the aid of a fixed output value from such a given trend curve, it also being known in the prior art how to take account of a measured ambient temperature by displacing the empirically motivated trend curve according to the detected ambient temperature. Thus, summarizing, it is known in the prior art how to operate the heating elements with constant output over time, rather than to regulate the heating device for example by means of a temperature measurement on the preform before reaching the continuous operating state of the heating device, and the output value being set is taken from a trend curve.

The above described heating devices of the prior art are thus at first started and the heating elements are operated with a certain preset starting power. Upon reaching a certain first temperature in the heating device, the first preforms enter the heating device and the heating device or the heating elements of the heating device are operated with a given power value. The heating device is controlled by this constant value setting. Only upon reaching a certain given result is the heating device regulated for the continuous operation. This given result may be, for example, the detecting of first surface temperatures of preforms.

In the present application and especially in the claims, a first and a second operating state of the heating device are discussed. The second operating state is the operating state of the heating device in which a thermodynamically stable equilibrium state has not yet been achieved, that is, the radiant heaters and the other elements of the heating device have not yet reached their thermodynamic equilibrium state. In this second operating state, the radiant heaters and the other elements are still striving towards the thermal equilibrium state. In terms of typical cycle times of a forming process from the thermal conditioning to the finished container, their temperatures and their radiation behavior are still changing in the direction of a dynamic equilibrium state. Typical cycle times lie in the range of 10 seconds, and these changes are in the range of a few degrees Celsius in this time window, i.e., relative to the heating device temperature. In the first operating state, which should be distinguished from this, a closed-loop control of the heating output occurs in the prior art, using a command value $F_{actual}$ detected by a measurement sensor within a closed-loop control system.

The drawback in the above described open-loop control of the heating device in the startup operation is that the preforms emerging from the heating device cannot yet have a very uniform temperature or a very uniform temperature profile, since the fixed setting of a power value for the heating elements can only be a suitable mean value for the startup phase. Therefore, the containers made from these preforms still have a relatively large variance in their properties.

The present invention is meant to provide a remedy here and to improve the quality of the temperature conditioning of the preforms and thus also the quality of the containers made from them during a startup operation of a heating device, i.e., the containers which are produced before reaching the continuous operation and also before attaining a thermodynamic equilibrium state of the heating device.

This problem is solved by a method as disclosed and claimed herein, by a heating device as disclosed and claimed herein and by a machine as disclosed and claimed herein.

According to the invention, it is provided that no fixed value for the heating output is dictated in the second operating state of the heating device. Instead, in the second operating state the heating device is operated with a heating output value that varies over time. It is preferable for the time variable heating output value to develop toward the basic heating output value to be used in the continuous operation, preferably it will reach this value at least approximately at the transition to the continuous operation, whereas previously it takes on higher heating output values. In the continuous operation, a closed-loop control occurs in the prior art about a basic heating output value. Namely, in the continuous operation there is generally provided a stabilizing closed-loop control based on a command value, e.g., the preform temperature, in a thermodynamic system otherwise existing at least approximately in an equilibrium state. Thus, the heating output values dictated by the closed-loop control will lie as a result about a basic heating output value. Therefore, it is advantageous for the control device in the second operating state to dictate the heating output values as developing toward this basic heating output value. As compared to the first operating state, the second operating state is no stabilizing closed-loop control, but rather a compensating open-loop control and/or closed-loop control of a system outside of an approaching equilibrium in order to take account of non-equilibrium effects. Preferably, it may be provided, e.g., that a time variable compensation value is added in the second operating state to the basic heating output value of the continuous operation, tending toward zero from initially higher values at the transition to the continuous operation.

In first possible embodiments, for example, the control device can carry out a closed-loop or open-loop control in the second operating state of the heating device with the aid of a command value. Such a command value may be, for example, the actual temperature of the heating device or also the time. For example, it is also possible to dictate varying power values in dependence on the temperature in the heating device. Thus, for example, a characteristic curve may be memorized in the control device, by which the heating output is controlled, this characteristic curve representing for example a functional relation between the temperature of the heating device and the power values which are to be set, or a functional relation between a time and the power values which are to be set. This characteristic curve may be dictated for example as a function of a measured ambient temperature, in order to allow for the influence of the ambient temperature. By contrast with the prior art, it is possible with the present invention to take account of the changing warm-up conditions in the startup phase of the heating device due to the increasing approach to the thermodynamic equilibrium state by changing the heating output values in an open loop or closed loop during the startup phase. This can be accomplished, for example, by memorizing suitable empirically determined characteristic curves. Further alternatives and modifications of the invention are given in the dependent claims.

For example, it is advantageously proposed that a temperature sensor is arranged in the heating device. This temperature sensor serves for detecting a temperature of the heating device and this temperature sensor may be designed and arranged basically as known in the prior art. According to the invention, it is provided that the transition to the first operating state, e.g., the transition to the continuous operating state of the heating device, i.e., the leaving of the second operating state, e.g., the startup operating state, occurs upon reaching a given heating device temperature. This temperature sensor may also provide measured temperature values in order to use them as a disturbance variable to carry out an open-loop or closed-loop control of the operation of the heating device in its second operating state.

The terms continuous operating state and first operating state and the terms startup state/startup phase and second operating state are used synonymously. Furthermore, it is advantageously proposed that the above described open-loop or closed-loop control of the heating device in the startup phase prior to reaching the continuous operating state begins only after reaching a minimum temperature in the heating device. Only at this time can preforms enter the heating device. For example, it may be provided that the heating elements are operated with high power in a first phase of the startup phase in order to quickly warm up the heating device. Upon reaching a first temperature, the closed-loop or open-loop control can then be utilized in the startup phase, and upon reaching a second temperature or upon detecting first measurement results on preforms the familiar closed-loop control can then commence in the continuous operating state of the heating device.

It was explained above that the invention can be realized for example by dictating characteristic curves for the startup phase. However, it is also advantageously possible for the control device to use measurement results from measurements on preforms or from measurements on containers produced from them. These measured values are obtained, for example, from a first, prior startup process, e.g., by measurement on preforms which were temperature-conditioned during the earlier startup process or on containers made from them, and used for the open-loop or closed-loop control in a later, second startup process in order to modify the open-loop or closed-loop control of the startup phase in the sense of an improvement or even a learning process. In this way, it is possible to improve the quality of the heating of the preforms successively from one startup process to another.

The measured values which are used for the modifying of the open-loop or closed-loop control of the startup phase may be temperature measurements on the preform, for example. For example, it is possible to measure a surface temperature of the preform by a pyrometer, as known in the prior art. Yet it is also possible to perform measurements on containers, for example, wall thicknesses of containers could be measured. In general, this involves a measurement of values on the preform or on the container that are indicative of the heating output furnished to the preform.

The above described self-improving or self-learning control device may be realized, for example, in that the results of the measurements are taken to a neural network. Single-layer neural networks are especially suitable for the stated task, and especially so-called general regression neural networks, also known as GRNN.

The control device is advantageously designed so that the open-loop or closed-loop control in the startup phase of the heating device is implemented as a disturbance variable of the closed-loop control of the heating device in the continuous operating state. In this way, the closed-loop control structures and control devices known in the prior art can still be used, being supplemented with a disturbance variable according to the invention, wherein it is preferably provided according to the invention that this supplementing is performed as a self-learning disturbance variable compensation. In particular, a compensation signal can be added to the actuating signals of the control device for the continuous operating state of the heating device in the startup phase of the heating device. Upon reaching the continuous operating state of the heating device, for example, the disturbance variable or the disturbance variable switching could be no longer used.

Figure 2:
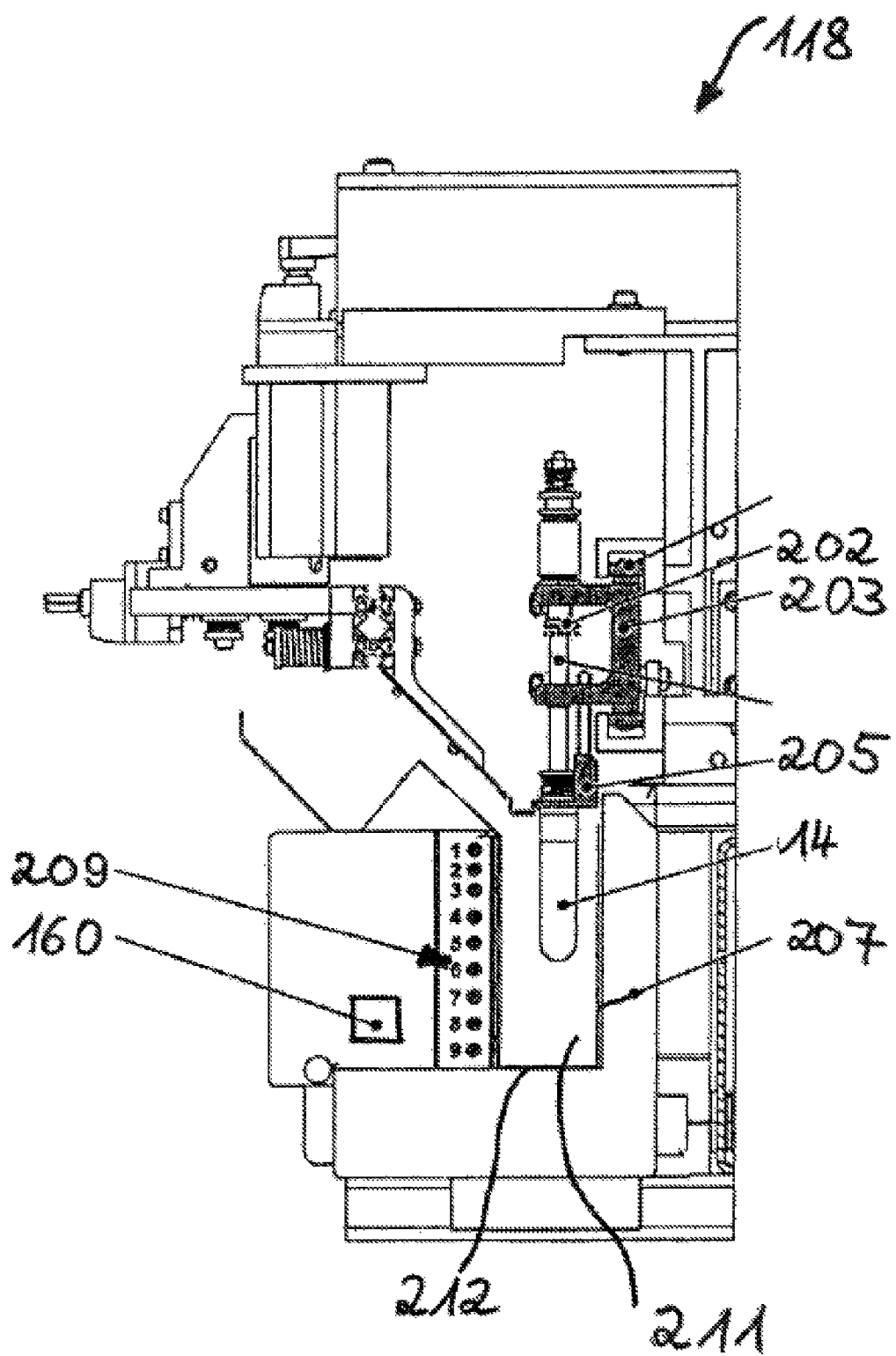
Figure 3:
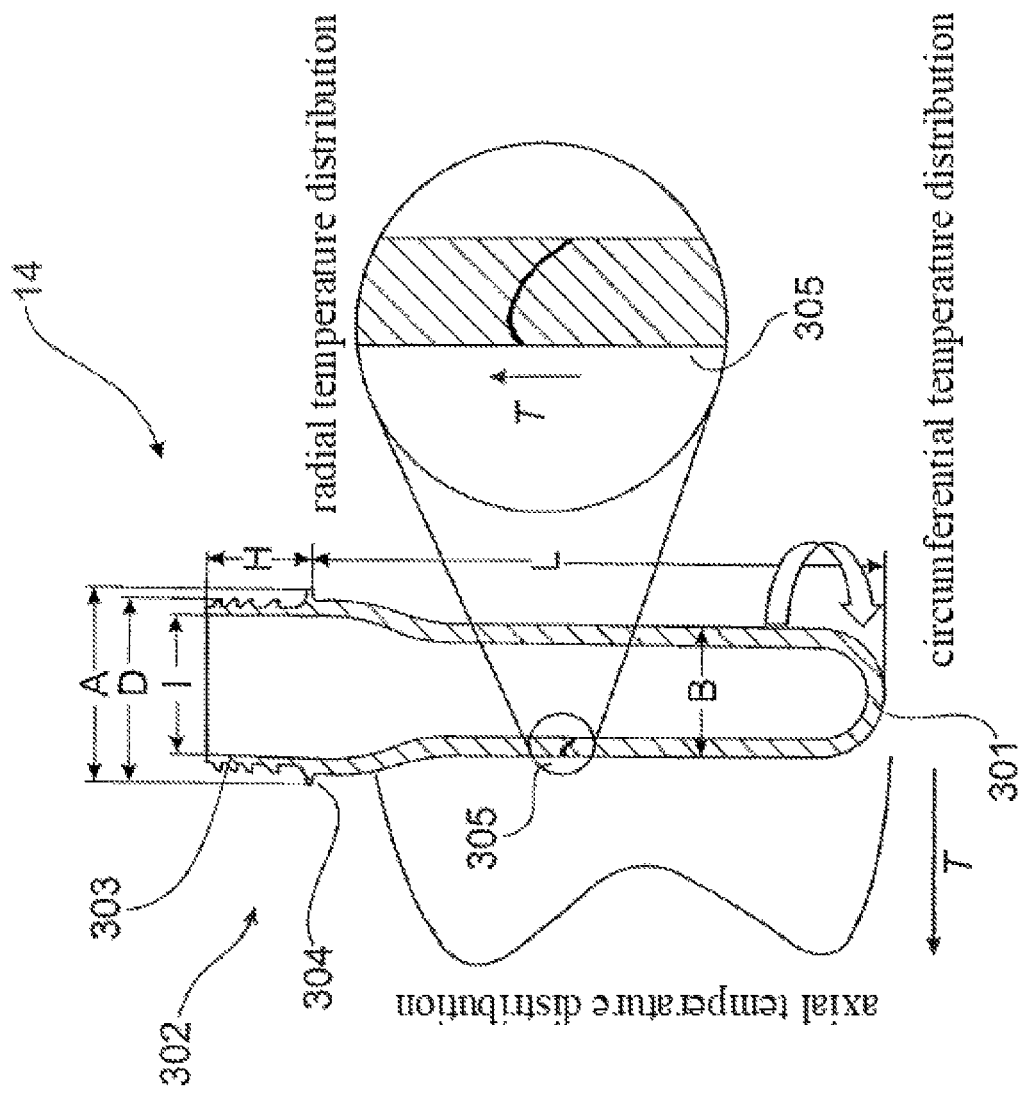
Figure 4:
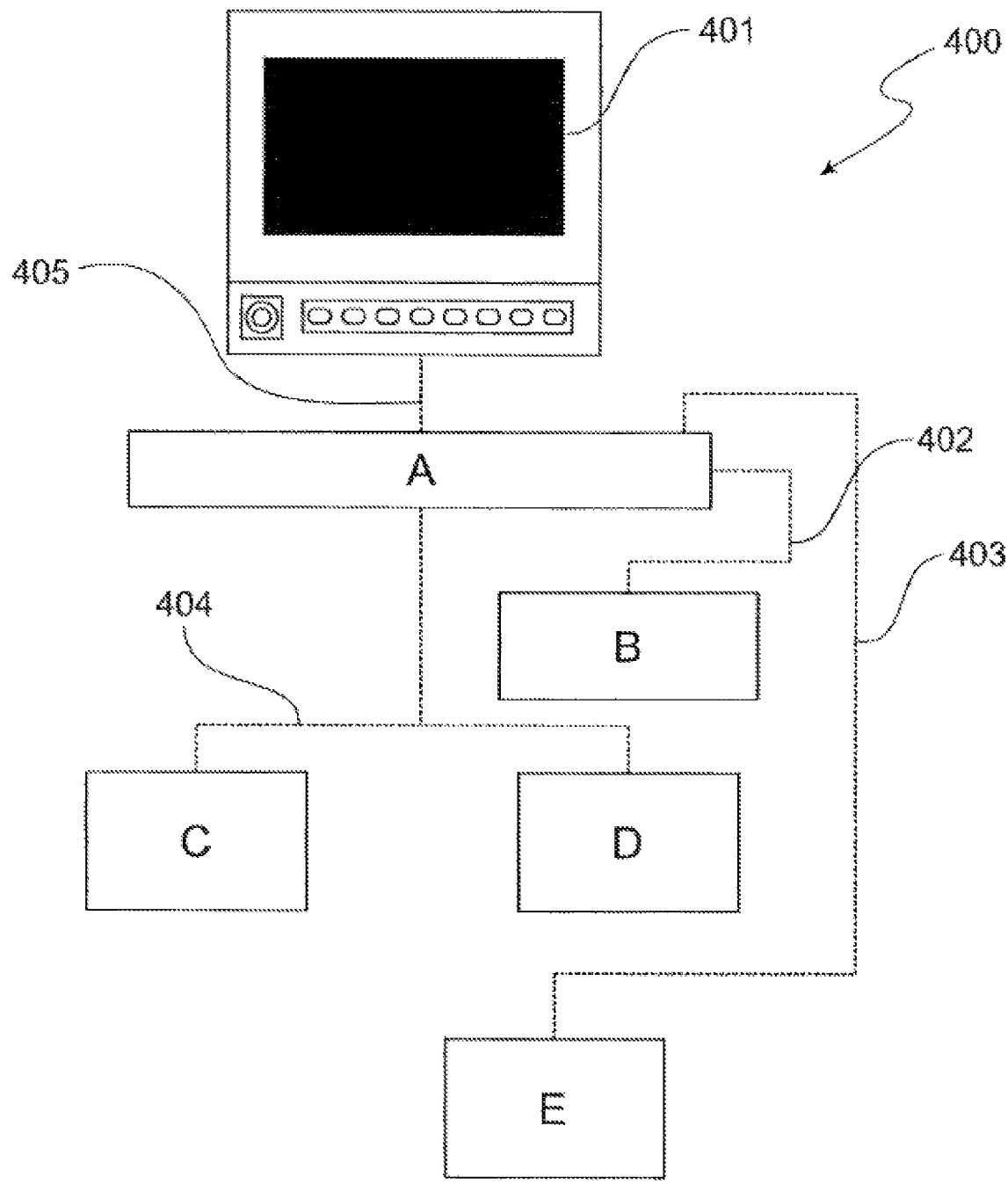
Figure 5:
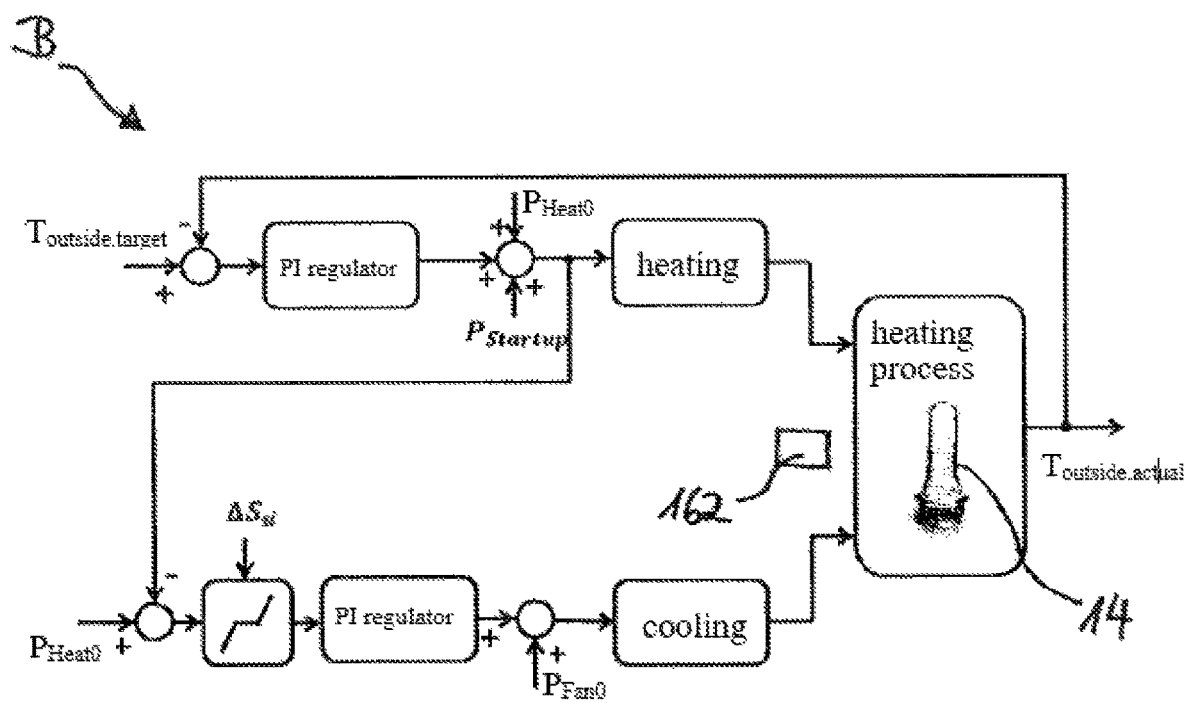
Figure 6:
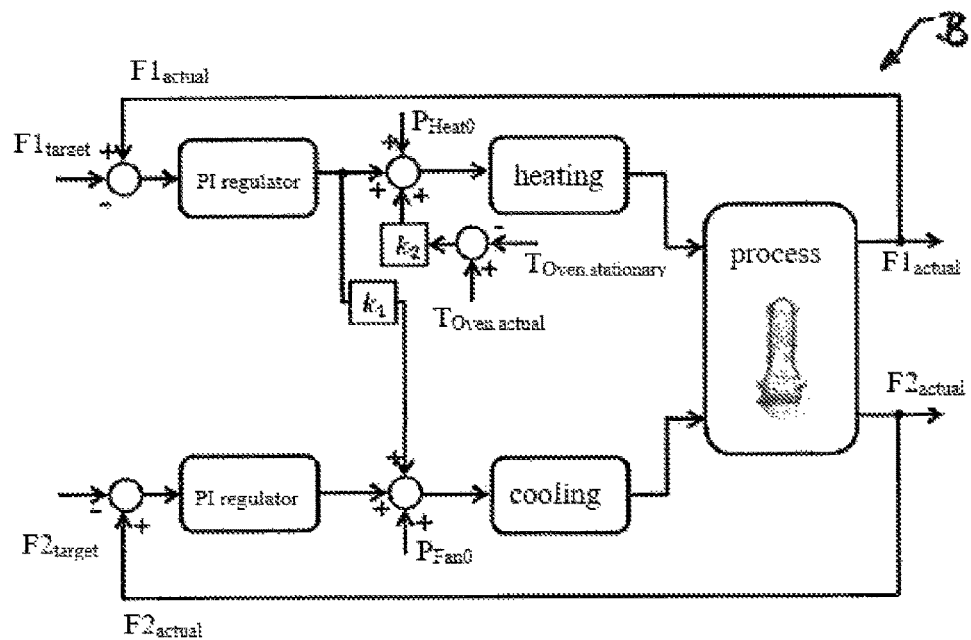
Figure 7:
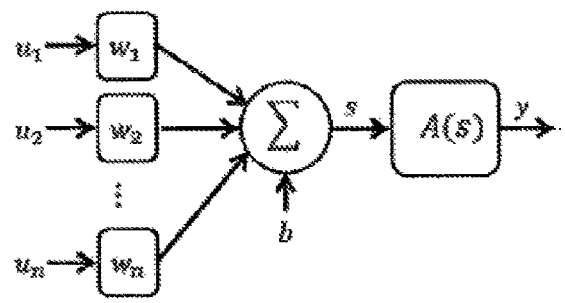
Figure 8:
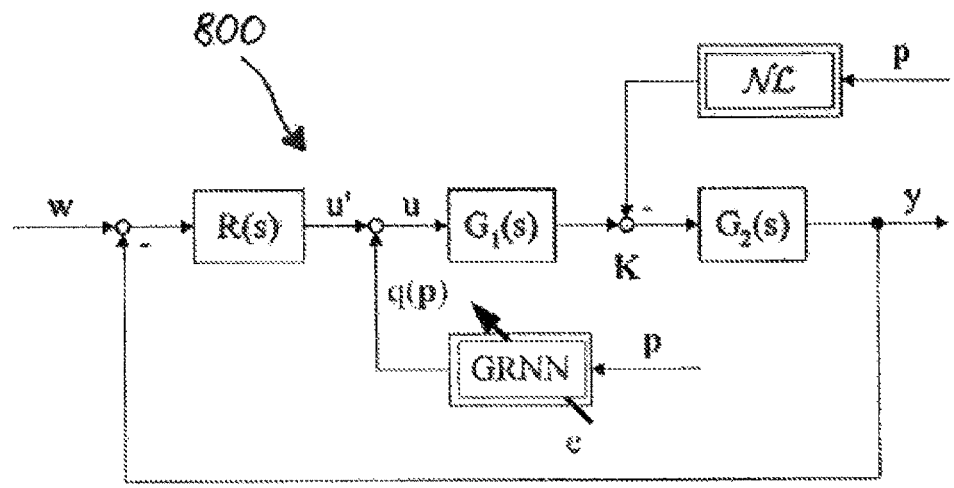
Figure 9:
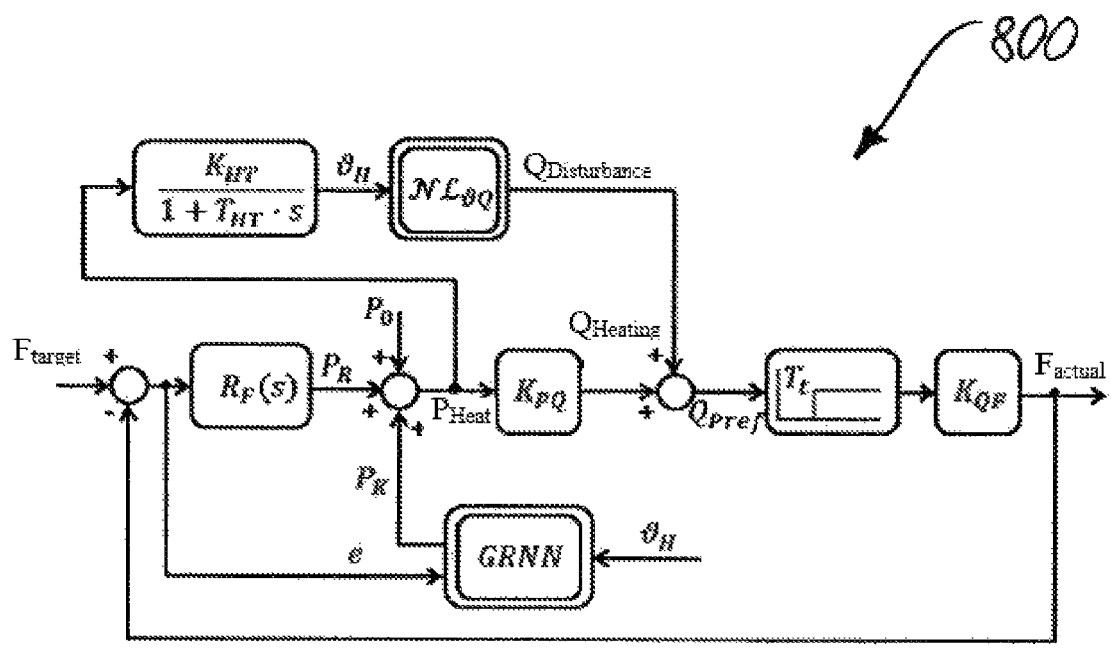
Figure 10:
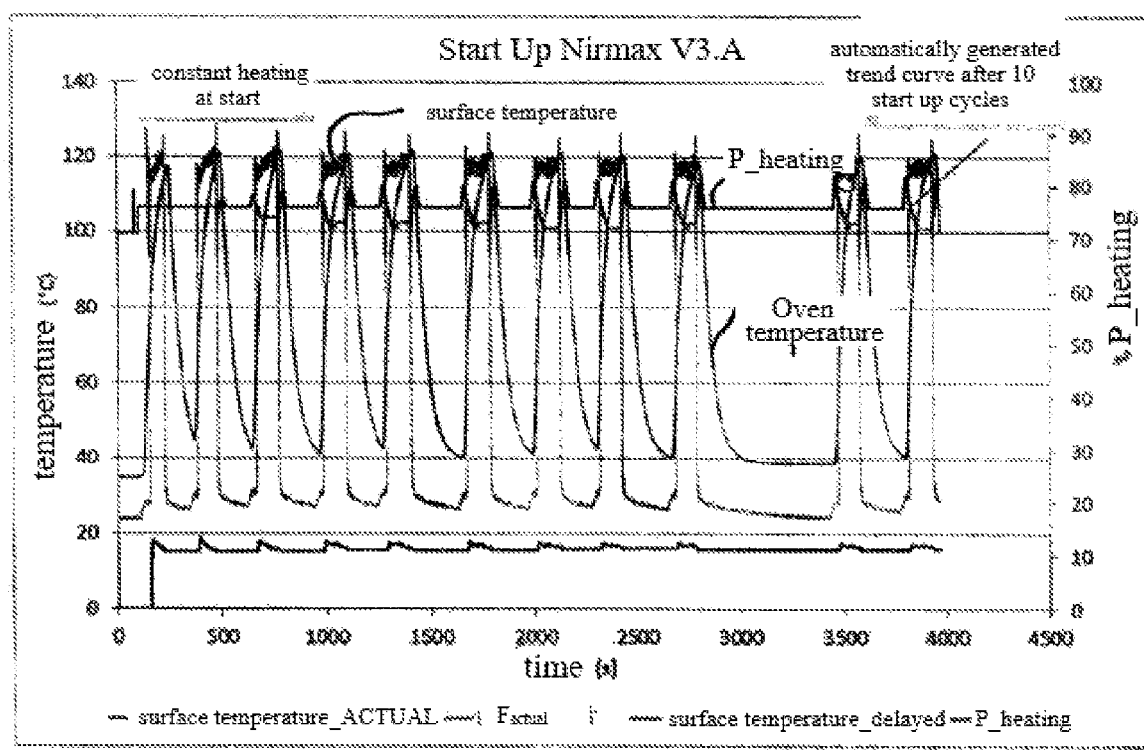

Further benefits, features and details of the invention will emerge from the following described exemplary embodiments making reference to schematic drawings. There are shown:

FIG. 1 a highly schematized representation of a forming machine or a machine for forming of containers from preforms, FIG. 2 a schematic representation of a heating box of a heating device, FIG. 3 a basic diagram of a temperature-conditioned preform with temperature profiling, FIG. 4 a schematic representation of one possible open-loop control architecture of a forming machine, FIG. 5 a diagram for the closed-loop control of a heating device, FIG. 6 an alternative diagram for the closed-loop control of a heating device, FIG. 7 a schematic representation of a neuron as part of a neural network, FIG. 8 a schematic representation of a self-learning compensation of a disturbance variable, FIG. 9 a schematic representation of a closed-loop control concept according to the invention with neural network, FIG. 10 a graph representation of experimental values for preform properties in the closed-loop control of a heating device according to the invention.

The layout of a forming machine 10 basically known in the prior art is represented in FIG. 1. The representation shows the preferred configuration of such a forming machine 10 in the style of a rotation machine with a rotating working wheel 110 carrying a plurality of forming stations 16. For a simpler drawing, however, only one such forming station 16 is represented. From a feeding device 112, schematically represented preforms 14 are fed continuously by using a transfer wheel 114 to a heating device 116. In the area of the heating device 116, also known as an oven, and in which the preforms 14 are transported along a heating zone and are thereby thermally conditioned, the preforms 14 may be transported for example with their mouth sections 22 pointing upward in the vertical direction or pointing downward in the vertical direction, depending on the application. The heating device 116 is outfitted with heating units 118, for example, which are arranged along a transporting device 120 to form the heating zone. The transporting device 120 may be, for example, a revolving chain with transport mandrels for holding the preforms 14. Suitable heating units 118 are, for example, heating boxes with IR radiators or light-emitting diodes or NIR radiators. Since such heating devices are known in various kinds in the prior art, and since the design features of the heating devices are not essential to the present invention, one may refrain from a more detailed description than that which appears from FIG. 2 and refer to the prior art, especially the prior art on heating devices for blow molding and stretch/blow molding machines and heating devices for forming and filling machines, all of which are subsumed by the term forming machines.

After an adequate temperature conditioning, the preforms 14 are passed from a transfer wheel 122 to a rotatably arranged working wheel 110, i.e., driven about a vertical machine axis MA, or to forming stations 16 which are arranged about the circumference of the working wheel 110. The working wheel 110 is outfitted with a plurality of such forming stations 16, where both a forming of the preforms 14 into the schematically represented containers 12 and a filling of the containers 12 with the intended filling material takes place. The forming of each container 12 occurs here at the same time as the filling, the filling material serving as the pressure medium during the forming. In blow molding machines, on the contrary, no filling occurs on this working wheel 110, but instead on a filling wheel with filling stations at a later time.

After the forming and filling, the finally formed and filled containers 12 are removed by an extraction wheel 124 from the working wheel 110, transported further onward, and taken to a discharge zone 126. The working wheel 110 revolves continuously with a desired circumferential velocity during the production operation. During this revolving process, a preform 14 is placed in a forming station 16, the preform 14 is expanded into a container 12, including the filling with a filling material and possibly including stretching, if a stretching rod is provided, and the container 12 is removed from the forming station 16.

It is furthermore provided, according to the embodiment in FIG. 1, to supply closure caps 130 depicted schematically to the working wheel 110 via a feeding device 128. In this way, it is possible to carry out a closure of the containers 12 already on the working wheel 110 and handle fully formed, filled, and sealed containers 12 with the extraction wheel 124.

Various thermoplastic materials may be used as the material for the preforms 14. For example, one may mention polyethylene terephthalate (PET), polyethylene (PE), polyethylene naphthalate (PEN) or polypropylene (PP). The dimensioning and the weight of the preforms 14 are adapted to the size, the weight, and/or the configuration of the container 12 being produced.

Typically a variety of electrical and electronic components are situated in the area of the heating device 116. Furthermore, the heating units 118 are provided with moisture-sensitive reflectors. Since a filling and forming of the containers 12 occur in the area of the working wheel 110 with the use of the liquid filling material, steps should preferably be taken to avoid the unintentional intrusion of moisture in the area of the heating device 116 in order to avoid electrical problems. This can be done, for example, with a bulkhead installation 132, affording at least a protection against spray. Furthermore, it is also possible to appropriately temper the transport elements for the preforms 14 used in the area of the transfer wheel 122 or to strike them with bursts of pressurized gas so that adhering moisture cannot get into the area of the heating device 116.

A handling of the preforms 14 and/or the containers 12 is preferably done with the use of tongs and/or clamping or piercing mandrels applying a holding force to the mouth section 22 at least for a portion on the inside or the outside. Such handling means are likewise rather well known in the prior art.

The forming machine 10 is outfitted with measuring sensors for purposes of its open-loop or closed-loop control. Thus, for example, it is customary for a temperature sensor 160 to be arranged in the heating device 116, in order to measure a temperature of the heating device 116. Furthermore, it is known in the prior art how to arrange a temperature sensor 162 at the exit of the clockwise rotating transporting device 120, being designed for example as a pyrometer and detecting a surface temperature of the temperature-conditioned preforms 14 moving past it. Finally, it is also known in the prior art how to perform measurements on finished containers 12 with measuring sensors. Thus, for example, a wall thickness measuring sensor 164 can be arranged at the discharge zone 126, in order to detect the wall thickness of a container moving past it. The aforesaid sensors may also be formed from multiple sensors arranged at different heights, for example in order to perform a temperature measurement along the preform lengthwise axis or for example to perform a wall thickness measurement along the container lengthwise axis. Multiple temperature sensors 160 can also be arranged in the heating device 116.

The heating unit 118 shown as an example in FIG. 1 can be seen in greater detail in a schematic sectional view in FIG. 2. Such heating devices are also known as heating boxes. Several of these heating boxes 118 are generally arranged alongside each other along the heating zone in order to form a heating tunnel, through which the preforms 14 are moved.

The heating box 118 shown in FIG. 2 in a schematic sectional view comprises multiple near infrared radiators 209, nine near infrared radiators 209 being arranged one above another in the vertical direction in the exemplary embodiment shown and each of these near infrared radiators 209 defining a heating level. These NIR radiators 209 may all be operated at the same power, if required, or one or more of them may be grouped together at different powers. Depending on the axial extension of the preform 14, lower lying radiator levels in the vertical direction may also be switched off. It is generally required to operate near infrared radiators 209 at different radiator levels with different heating output in order to achieve a temperature profile in the preforms 14.

Located opposite the near infrared radiators 209 is a counter-reflector 207, which reflects the thermal radiation impinging on it back in the direction of the preform 14 and thus back into the heating tunnel 211. The heating tunnel 211 is closed at the bottom by a floor reflector 212. The preform 14 is protected against thermal radiation at its mouth end by a support ring shield 205, since the mouth region with the thread formed there should be protected against needless heating. The support ring shield 205 is arranged on the handling device 203, which as explained in FIG. 1 can be part of a revolving chain. The handling device 203 furthermore comprises a clamping mandrel 202, which engages by clamping in the mouth section of the preform 14. Such clamping mandrels 202 and such handling devices 203 are sufficiently well known in the prior art and need no further explanation. The basic layout of the above described heating box 118 is also known in the prior art.

The temperature sensor 160 shown in principle in FIG. 1 is likewise depicted in the heating box 118 of FIG. 2, this temperature sensor 160 being generally situated behind a reflector, for example, behind the back reflector 207. This temperature sensor 160 detects a temperature of the heating box 118. Basically, it would also be possible to detect a temperature inside the heating tunnel 211 or to perform a temperature measurement on the preform 14 inside the heating tunnel 211.

FIG. 3 shows in a sectional view a typical preform 14 with a closed bottom region 301 and an open mouth section 302. In the area of the mouth section 302, an external thread 303 and a support ring 304 are formed. After the temperature conditioning is completed, a certain temperature distribution is produced in the preform 14. Thus, for example, by an appropriate heating in the axial direction of the preform 14 it is possible to create a temperature profile, as shown at the left side of the preform 14. It can be recognized there that a higher temperature has been realized in the bottom region and in a region beneath the support ring than in the region in between. But it is also possible to heat the preform homogeneously in the axial direction. It is evident from the magnified portion of the wall region 305 that it is also possible to establish a temperature variation inside the preform wall. This is due, among other things, to the fact that the absorption of the thermal radiation results in a stronger heating radially outside than radially inside. Temperature differences in the preform wall cancel out over time due to thermal equalization processes, but these temperature equalization processes are relatively slow in the preforms typically made of PET.

In addition, the preform 14 may also be given a temperature profile in the circumferential direction. This is known, for example, for preforms which are to be transformed afterwards into nonround containers, such as oval containers.

FIG. 4 shows the schematic representation of one possible modular control architecture of a control device 400 for a forming machine 10. A master control system is indicated by the letter A, a control device for the open-loop or closed-loop control of a heating device with the letter B, a control system for driving the working wheel 110, for example, by the letter C, safety devices such as emergency stop button by letter D, and a control device for the forming process, i.e., for the possible driving of a stretching rod, for on and off switching valves for a forming fluid, etc., is denoted by letter E. Control-relevant data can be shown on a display 401 and the display 401 is provided with values to be displayed from the master control system via a data line 405. The display 401 may also function as a data entry unit and values entered through this data entry unit can be transferred via the connection line 405 to the master control system A. The further data lines 402, 403 and 404 and the data line 405 may be designed as a data bus, for example, and serve for example for the transfer of data between the master control system A and the further control modules or between the control modules.

FIG. 5 shows the schematic layout of a control device B for the closed-loop heating control, selecting as the command value the surface temperature $T_{outside}$ of a preform. The heating device regulated by this closed-loop control works with heating devices and with cooling devices in the form of a fan. The closed-loop control receives as its working points a start heating output $P_{heating0}$ and a start fan output $P_{fan0}$, since in the present instance a cooling of the preform surface is provided in addition to heating radiators. The closed-loop control of the heating should be done with the aid of measuring a surface temperature of the preform 14, and for this purpose a pyrometer 162 is arranged at the end of the heating zone, as explained in FIG. 1. With the aid of the surface temperature $T_{outside,ACTUAL}$ of the preform 14, measured with the pyrometer 162, the closed-loop control tracks the heating output. Furthermore, it may be provided that an ambient temperature is detected and this ambient temperature also goes into the closed-loop control of the heating device. In the exemplary embodiment shown, it is provided that a decrease in the heating output is detected. In order to prevent too strong a decrease in the heating output, when the output drops below $\Delta S_u$ the surface cooling power of the fan is altered. For example, if the heating output decreases, the surface cooling power is increased until such time as the heating regulator determines a lowering of the surface temperature of the preform and the heating output again increases.

FIG. 6 shows schematically a control device B for the closed-loop heating control having two disturbance variables and two actuating variables. The first disturbance variable is chosen to be a variable $F1_{ACTUAL}/F1_{TARGET}$, e.g., the preform temperature, and the second disturbance variable is a variable $F2_{ACTUAL}/F2_{TARGET}$. The actuating variables are chosen to be, on the one hand, the heating output $P_{Heat}$ of the heating device and on the other hand the cooling output $P_{Fan}$ of the ventilation. To increase the robustness of the control, the control architecture shown in FIG. 6 is designed as a decentralized multivariable control.

In order to improve the nonstationary behavior of the heating device, a disturbance variable feedforward $k_2$ has been integrated in the regulator per FIG. 6. This adds an additional percentage power to the equilibrium heating output $P_{Heat0}$ with a factor in dependence on the difference between the ACTUAL oven temperature $T_{Oven,ACTUAL}$ and the stationary oven temperature $T_{oven,stationary}$, i.e., the oven temperature after reaching the equilibrium state. $P_{Heat0}$ represents a baseline value. Thus, before reaching the equilibrium state of the heating device or the oven there is produced a higher heating output, in order to bring the preforms up to the desired temperature. The block diagram shown in FIG. 6 furthermore provides a decoupling branch $k_1$, in order to lessen the internal couplings. In the exemplary embodiment shown, the command variable $F1_{ACTUAL}/F1_{TARGET}$, e.g., the preform temperature, is given priority over the command variable $F2_{ACTUAL}/F2_{TARGET}$. The disturbance variable feedforward is represented in the block diagram as a disturbance $k_2$ which is made dependent on the difference between the temperature of the heating device $T_{Oven,stationary}$ when equilibrium conditions are present and the actual temperature of the heating device $T_{Oven,ACTUAL}$. The greater this temperature difference, the larger the disturbance variable effect should be and the higher the factor should be chosen to increase the heating output compared to the baseline heating output.

The heating output $P_{Heat0}$ and the fan output $P_{Fan0}$ represent output setpoints for these actuating members and describe a working point or a baseline point. These outputs are changed in dependence on the command variables.

FIG. 7 shows a basic representation of the layout of a neuron of a neural network. Neural networks are generally distinguished by their learning ability. The functioning of a neural network resembles the functioning of the human brain, and it consists of many individual neurons, which are interconnected by synapses. FIG. 7 shows the layout of one such neuron. This neuron consists of the summation of the incoming signals $u_1, u_2, \ldots, u_n$ of the synapses and an activation function, which determines the output value on the basis of the input value. The emphasizing of the synapses determines the signal strength at the summation point. In a technical sense, this may be viewed as a weighting $w_1, w_2, \ldots, w_n$. The working point of the activation function can be dictated by an offset b. Learning occurs in neural networks generally by changing the weights $w_1, w_2, \ldots, w_n$ of a neuron by a learning law.

Neural networks are often constructed in multiple layers. But then there is little possibility of interpreting the learned behavior. Single-layer networks, on the other hand, are readily interpretable and it is therefore provided advantageously by the invention that a single-layer network is present.

Basically, neural networks and the learning behavior of neural networks as well as the technical implementation of neural networks are rather well known. For this reason, the following figures only indicate in general manner how such a neural network can be integrated in the closed-loop control of a heating device.

FIG. 8 shows a self-learning regulator 800, such as is known for example from the prior art. This self-learning regulator 800 consists of a traditional linear closed-loop process (S) and a learning disturbance variable compensation by means of a GRNN, where GRNN stands for a general regression neural network. The otherwise linear closed-loop process, composed of $G_1(s)$ and $G_2(s)$, is seized by a nonlinear and unknown disturbance variable NL. The disturbance variable depends on the measurable quantity p and intrudes in the closed-loop process at the point K. The task of the GRNN is now to compensate for the influence of the nonlinear disturbance function on the output. According to the invention, this involves a compensation for the circumstance that the heating device has not yet reached its thermodynamic equilibrium state. Therefore, the preforms encounter heating conditions which differ from the equilibrium state. The neural network GRNN is supposed to eliminate this effect by a learning process and by disturbance variable compensation.

The benefit of the regulator structure shown in FIG. 8 is that the closed-loop control circuits thus far used in the prior art also do not need to be fundamentally changed. It is only necessary to add the compensation signal of the neural network to the actuating signal of the regulator. Thus, the existing disturbance variable compensation of the basic regulator can be replaced in modular fashion by the neural network, or if no disturbance variable compensation of the basic regulator is provided then such a disturbance variable compensation can now be added.

FIG. 9 shows a simplified disturbance model of the partial closed-loop control system for the surface temperature of the preforms and the heating device. A neural network GRNN now comes in at the point of the known "fixed disturbance variable feedforward" by increasing the heating output with a constant factor in the prior art. The disturbance is represented, for example, as an unknown nonlinear function $N_{L\theta Q}$. This depends on the temperature $\theta_H$ of the heating device, measured for example with a PT-100, for example the temperature $\theta_H$ of the reflector in the heating device, and it outputs an energy quantum $Q_{Disturbance}$ that is radiated into the preform. The reflector has a given behavior, which is dependent on the power setting of the thermal radiator of the heating device. The total energy $Q_{Pref}$ put into the preform is composed of the secondary energy input by heated reflectors, for example, and the primary energy input $Q_{Heat}$ due to the radiation of the thermal radiator. The primary heating energy after the startup phase is established around the working point. The dynamics of the heating process as well as the dead times of the closed-loop process are combined into the dead time $T_t$ for simplicity.

In order to compensate for the deficit in heating energy $Q_{Disturbance}$, the neural network GRNN switches on an auxiliary power $P_k$ in dependence on the temperature measured in the heating device. The control error e is used in order to train the neural network during multiple startups of the heating device.

FIG. 10 illustrates the positive outcome of a control device for a heating device which is supplemented with a neural network. The time in seconds is plotted along the x-axis, and on the y-axis there is plotted at the left side an oven temperature and a measured surface temperature of the preforms, on the one hand. On the other hand, on the right side there is plotted a heating output of the heating device. Several startup processes have been plotted along the time axis. With the aid of the respectively measured surface temperatures of the preforms it can be seen that a significant decrease in the temperature variance in the measured surface temperature occurs with increasing number of startup processes. This can be seen, for example, from the fact that the measured surface temperature of the preforms has a generally increasing tendency during the first startup process, when the heating output $P_{Heat}$ was held constant. This rising tendency flattens out with each further startup process and is hardly still evident during the last startup processes. Instead, the surface temperatures of the measured preforms vary here about a substantially horizontal mean temperature. As a result, the temperature conditioning of the preforms during later startup processes occurs with much less temperature variance and the resulting containers show significantly fewer fluctuations in their properties, e.g., in the wall thickness. On the whole, there is a distinct quality improvement in the containers produced.

The invention claimed is:

1. A method for operating a heating device for thermally conditioning preforms made of thermoplastic material passing through the heating device for a subsequent forming process during which the preforms are formed into containers with a forming fluid fed under pressure into the preforms, the method comprising:
    operating the heating device in a first operating state to thermally condition the preforms passing through the heating device during a continuous operation phase of the heating device when an equilibrium temperature of a thermodynamically stable equilibrium state of the heating device has been reached;
    operating the heating device in a second operating state to thermally condition the performs passing through the heating device during a startup phase of the heating device when the heating device is approaching but has not reached the equilibrium temperature of the thermodynamically stable equilibrium state of the heating device; and
    optionally, operating the heating device in one or more additional operating states that are different than the first operating state and the second operating state;
    wherein the heating device is operated within a basic heating output value range in the first operating state of the heating device, and wherein the heating device is operated with heating output values that are outside of the basic heating output value range and that vary over time in the second operating state.

2. The method according to claim 1, wherein in the first operating state regulation of the basic heating output value range of the heating device is controlled by a regulator within a closed-loop system using a command value $F_{actual}/F_{target}$.

3. The method according to claim 2, wherein the heating output values that are outside of the range of basic heating output value range and that vary over time are controlled within an open-loop or a closed-loop system in the second operating state dependent on results of measurements of preforms or containers made from preforms that have passed through the heating device during operation of the heating device in a prior second operating state.

4. The method according to claim 3, wherein the results of the measurements are supplied to a neural network.

5. The method according to claim 4, wherein the neural network is a single layer neural network.

6. The method according to claim 4, wherein the neural network is a general regression neural network.

7. The method according to claim 4, wherein regulation of the second operating state is implemented as a disturbance variable in actuating signals of the regulator of the heating device used in the first operating state.

8. The method according to claim 7, wherein the disturbance variable is a self-learning disturbance variable compensation signal.

9. The method according to claim 8, wherein, in the second operating state, the self-learning disturbance variable compensation signal is added to the actuating signals of the regulator of the heating device used in the first operating state.

10. The method according to claim 1, wherein a temperature sensor is arranged in the heating device, and wherein a transition from the second operating state to the first operating state occurs when the sensor detects that a predetermined heating device temperature has been reached.

11. The method according to claim 10, wherein the second operating state of the heating device begins only after the sensor detects that a minimum heating device temperature has been reached.

\* \* \* \* \*